United States Patent [19]
Abbiate et al.

[11] Patent Number: 5,315,622
[45] Date of Patent: May 24, 1994

[54] DATA CIRCUIT TERMINATING EQUIPMENT (DCE) INCLUDING TIMING ARRANGEMENTS CIRCUITS CONTROLLED BY PROCESSING MEANS

[75] Inventors: Jean-Claude Abbiate, La Gaude; Alain Blanc, Vence, both of France; Gottfried Ungerboeck, Langnaud a. Albis, Switzerland

[73] Assignee: International Business Machines Corporation, Armonk, N.Y.

[21] Appl. No.: 754,104

[22] Filed: Sep. 3, 1991

[30] Foreign Application Priority Data

Sep. 28, 1990 [EP] European Pat. Off. ........ 90480150.3

[51] Int. Cl.⁵ ............................................. H04L 7/00
[52] U.S. Cl. .................... 375/106; 375/117; 375/118
[58] Field of Search ............ 375/7, 8, 106, 118, 375/117; 379/93; 370/91

[56] References Cited

U.S. PATENT DOCUMENTS 4,761,800  8/1988  Lese et al. ........................ 375/117

FOREIGN PATENT DOCUMENTS

A111743  5/1988  Japan ................................ 375/118

OTHER PUBLICATIONS

Patent Abstracts of Japan, vol. 14, No. 200 (E-920) (4143) Apr. 24, 1990, & JP-A-2 410056 (Hitachi Ltd) Feb. 9, 1990.

*Primary Examiner*—Stephen Chin
*Assistant Examiner*—Tesfaldet Bocure
*Attorney, Agent, or Firm*—Edward H. Duffield

[57] ABSTRACT

Data Circuit Terminating Equipment (DCE) allows the connection of a Data Terminal Equipment (DTE) to a telecommunication line. The DCE includes timing elements for providing the DTE with any desired transmitter signal element timing and any desired receiver signal element timing. The timing elements include processing elements for computing a sequence of digital values A(n) and for deriving therefrom a corresponding sequence of interrupt signals T(n). The receiver signal element timing, the transmitter signal element timing, the transmit sampling clock pulsing the D/A converter and the receive sampling clock pulsing the A/D converter are all controlled by different sequences of digital values computed by the processing elements. By generating appropriate sequences of digital values, the processing elements can provide any desired relationship between the different clocks to satisfy a transmit signal element timing slaved to the receiver signal element timing in synchronous mode, or on an external clock in tailing mode. The timing elements can also provide a transmit sampling clock slaved to the receive sampling clock in order to perform powerful digital echo cancellation techniques. Moreover, the processing elements can control the persistence of a received bit, which if a STOP bit, can allow the compensation of the DTE and the line data throughput difference.

14 Claims, 6 Drawing Sheets

DATA CIRCUIT TERMINATING EQUIPMENT (DCE) INCLUDING TIMING ARRANGEMENTS CIRCUITS CONTROLLED BY PROCESSING MEANS

TECHNICAL FIELD

This invention relates to Data Circuit Terminating Equipment (DCE) and particularly to the timing circuits included in such equipment.

BACKGROUND ART

Clocking is one of the complex aspects in Data Circuit Terminating Equipments also called modems. A DCE requires timing circuits allowing a particular Data Terminal Equipment (DTE) to communicate with another DTE through a telecommunication line.

The DCE must include timing arrangement circuits providing the different clocks that are necessary in the modem and particularly those used at the interchange circuits between the DTE and the DCE. Indeed, according to the V24 CCITT Recommendations (Fascicle VIII.1—Rec. V.24), clocks are to be included in the modems to provide the DTE with transmitter signal element timing on circuit 114 (called 'Transmitter signal element timing' circuit) and receiver signal element timing on circuit 115 (called 'Receiver signal element timing' circuit). Alternatively, the Transmitter signal element timing may be originated in the DTE instead of in the DCE equipment and be transferred to the modem via an interchange circuit 113. For simplicity, the clocks existing on interchange circuit 115 and interchange circuit 114 are respectively called 'Transmit clock' (XC) and 'Receive clock' (RC). FIG. 1a illustrates the well known way of generating the receive clock RC provided at the interchange circuit 115 according to the CCITT V.24 Recommendation. Traditionally receive timing signals are provided from an internal oscillator 1 included in the modem and a succession of dividing circuits: a controlled divide-by-(K±1) circuit 2, (which performs a divide-by-(K+1) or a divide-by-(K−1) operation according to the value appearing on its control lead, a divide by M circuit 3, and a divide by N circuit 4. The output of divide by M circuit 3 provides a Receive sampling clock on a lead 7 pulsing an A/D (Analog to Digital) converter 5, for instance a sigma-delta coder. The A/D coder converts the analog signal received on the telecommunication line into a digital PCM information that is transferred to a microprocessor 6. The processor 6 performs an analysis of the converted signal on the line and controls divide-by-(K±1) circuit 2 so that the Receive sampling clock at the output of circuit 3 precisely indicate when the line signal has to be sampled. The Receive clock operates in synchronism with the receive sampling clock. FIGS. 1b illustrates the traditional way of generating an internal transmit clock XC which is then transferred to the DTE via interchange circuit 114 according to the CCITT V.24 Recommendation. The internal transmit clock is generated from internal oscillator 1 through a set of two dividing circuits, resp. a divide-by-Q circuit 9 and a divide by R circuit 10. the output of divide-by-Q circuit also provides a transmit sampling clock on a lead 12 which is used to pulse a D/A (Digital to Analog) converter converting digital PCM information coming from processor 6 (not shown) into an analog signal which is eventually transmitted to the telecommunication line.

It appears from above that the known timing arrangements circuits involve numerous dividing circuits which increases the overall complexity of the modem. The latter complexity is even more increased when considering the new functions that are required in modern DCE: the capability of operating in tailing mode, with synchronous networks, with advanced testing functions such as analog loop, the capability of providing echo cancellation in full duplex modem of the V32 family, data multiplexing on the DTE interface, Error correction procedures described in CCITT V42 requirements.

A modem providing tailing capability is such that the Transmitter signal element timing is originated in the DTE instead of in the DCE equipment and is transferred to the modem via interchange circuit 113. FIG. 1c shows the additional elements that are traditionally added to the circuit of FIG. 1b in order to provide a transmit sampling clock on lead 12 which is slaved on an external clock on interchange circuit 113 which is provided by the DTE. For this purpose, a comparator 14 having an enable lead 13 compares the value of the Transmit clock XC with that of the external clock and according to the result of the latter comparison, comparator 14 controls a controlled divide-by-(P±1) circuit 8 which is inserted between internal oscillator 1 and divide-by-Q circuit 9. When enable lead 13 is set at a high level, comparator 14 creates a feedback loop between the external clock existing on circuit 113 and the transmit clock on circuit 114 thereby entailing the latter to be slaved on the former. On the contrary, when enable lead 13 is set at a low level, comparator 14 and divide-by-(P±1) are disabled what results in the circuit of FIG. 1c operating as that of FIG. 1b.

The complexity of the modem increases more when the latter is intended to be used in synchronous networks, for instance Digital Data Service in the United States of America. A DCE designed to be connected to synchronous networks is such that the transmit clock is slaved on the receive clock. FIG. 2a shows a traditional timing arrangement circuit providing this additional capability with respect to the circuits of FIG. 1c. The external clock 113 and receive clock 115 are transmitted to the two inputs of a multiplexer circuit 15 which, according to the state of its select lead, distributes one of the two latter clocks to the input of comparator 13. Therefore, according to the state of the select lead of multiplexer 15, the transmit clock on lead 114 is slaved on the external clock on circuit 113 or the receive clock on circuit 115. In addition to the complexity of the above timing arrangement circuits required in synchronous modem, a second drawback appears in the prior art solution. Generally for testing purposes, an analog loop may be required in a DCE which entails the switching of the transmit clock on lead 114 from the receive clock to the internal clock. In traditional DCE equipment, that switching results in glitches appearing in the transmit clock which are likely to disturb the transmission between the DTE and its associated DCE equipment.

Another step in the continuous sophistication process of the timing arrangement circuits in DCE equipment came with the insertion of echo cancellation circuits in the modem. High-speed full-duplex data transmission over two-wire lines is of immense practical interest. The techniques for achieving this goal implies echo cancellation techniques. The transmitter and receiver included in the DCE are jointly coupled to a two-wire line via an hybrid transformer. In an environment of changing channel characteristics (e.g. switched network), the hybrid balancing, if fixed, will at best provide a compromise match to the line impedance. In this mode, a vestige of the local transmitted signal, leaking through the hybrid, can be expected to interfere with the received signal from a far-end simultaneously operating transmitter. To remove the interfering echo component, the local receiver must perform echo cancellation, that is, estimate the echo signal and subtract it from the received signal prior to making decisions. In a environment of digital signal processing it is desirable to perform echo cancellation entirely digitally. Therefore it appears that the above mentioned subtraction of the echo component from the incoming signal requires the transmit and receive sampling clocks on leads 12 and 7 to be equal. FIG. 2b illustrates the additional components that are required for providing a receive sampling clock on lead 7 equal to the transmit sampling clock on lead 12. For this purpose an additional multiplexer circuit 16 has two inputs respectively connected to the output of divide-by-M circuit 3 and divide-by-Q circuit 9 and an output providing the receive sampling clock on lead 7. A SELECT lead controls multiplexer 16 by processor 6 (not shown in FIG. 2b), which control results in one of the two signals existing at the output of divide-by-M circuit 3 or divide-by-Q circuit 9 being transmitted to lead 7. The complexity of the timing arrangement circuits increases more when considering the fact that in some cases such as 19200 Bps modems, the ratio bit-time/baud-time traditionally simple becomes complex. For instance, telecommunication equipment knows traditional DCEs provide a 1200, 1600 or 2400 bauds modulation associated with a 4800 bps or 9600 bps transmission. The above mentioned ratio having thus simple values (2 or 4), and the divider circuits involve only a few components. However, the tendency of increasing the use of the bandwith of the telecommunication line entails the utilization of less simple ratio. Such complex ratios inevitably increases the already complex timing arrangement circuits involved in the DCE equipment.

An additional degree in the sophistication process of timing arrangement circuits in the DCE is reached with the V14CCITT requirements in the case when a synchronous DCE communicates with a asynchronous DTE. In such a communication, the DCE which is connected to a asynchronous DTE has to provide the acquisition of the asynchronous character during transmission and the reconstitution of the asynchronous characters during reception with the control of the bit length in order to compensate the DTE and the line data throughput potential difference. Indeed, the data to be transmitted at the DTE interface by the DCE may have a higher throughput than that of the line throughput. In that case, the transmitter element on one side of the line has to suppress, from time to time, a STOP bit in the line transmission. On the other side, the receiver must detect the missing STOP bits in the received data stream and insert a shorter STOP bit in the data transferred to the DTE. Traditionally, the V14 function is achieved by means of complex divider circuits providing from time to time a shorter clock pulse corresponding to a shorter STOP bit that is to be transmitted to the DTE.

Finally, it is highly desirable in modern DCEs to support advanced functions such as data multiplexing on the DTE or error correcting procedures according to the CCITT V42 Recommendations.

As a result, it clearly appears that new functions are continuously added to modern DCEs, thus entailing an on-going sophistication of the timing arrangement circuits. The sophistication of the time arrangement circuits in recent modems have lead to a large multiplication and use of hardware components such as switches, multiplexers, dividers which inevitably increases the cost of the DCE equipment. Moreover, the use of traditional timing arrangement circuits and the large number of hardware components and dividers circuits therein included substantially limit the adaptability of the DCE modem to the new functions that are likely to be requested in the future.

SUMMARY OF THE INVENTION

Therefore a need has appeared in telecommunication equipment and particularly in DCE for simple and effective timing arrangement circuits allowing most of the telecommunication functions that are required in a modern DCE, and also allowing easy adaptability to the future functions.

It is an object of this invention to provide a DCE equipment having simple and effective timing arrangement circuits not requiring a large amount of multiplexing and dividing circuits and which allows advanced telecommunication functions without necessitating a large amount of hardware components.

It is another object of the present invention to provide DCE equipment that includes simple timing arrangement circuits providing a transmit clock to the DTE which can be switched from an internal clock to an external clock and further to the receive clock without requiring a large amount of hardware components and without creating any glitches in the transmit clock whereby the DCE allows synchronous and tailing communications.

It is a further object of this invention to provide DCE equipment having simple timing arrangement circuits providing the PCM clocks to the A/D and D/A converters which can be easily slaved one another thereby allowing echo cancellation functions.

It is a further object of this invention to provide a DCE equipment having simple timing arrangement circuits allowing the control of the STOP bit length in V14 asynchronous communication.

These and other objects of the invention are achieved by means of the Data Circuit Terminating Equipment (DCE) of the invention which allows the connection of a Data Terminal Equipment (DTE) to a telecommunication line and which includes timing arrangement circuits for particularly providing the DTE with transmitter signal element timing and receiver signal element timing. The timing arrangement circuits include means for generating a set of N timing pulses at the nominal receive clock rate on the occurrence of one interrupt signal transmitted at a first input lead.

Particularly, the timing arrangement circuit includes means for generating a set of N receive clock pulses at the nominal receive clock rate (2400 bps, 4800 bps or 9600 kps . . . ) on the occurrence of an interrupt signal transmitted at its input lead. By generating sequence successive interrupt signals at appropriate instant, at the input lead of one timing arrangement circuits, and by deriving the interrupt signals from a sequence of digital values A(n) computed by a processor, it is possible to control the frequency and the phase of the clock produced at the output of the considered timing arrangement circuits. It is therefore possible to control the frequency and the phase of the receive clock by an appropriate sequence of digital values computed by the processor. By controlling the generation of multiple sequences of digital values A(n), B(n), C(n) . . . , the processor can control the frequency and the phase of every clock generated by the timing arrangement circuits.

Particularly, the processing means can easily slave the transmitter signal element timing either to an internal clock, an external clock, or the receiver signal element timing by generating an appropriate sequence of digital values.

In one embodiment of the invention, the deriving means includes a timer which is continuously clocked by an internal clock and a register in which the processing means successively stores the sequence of digital values A(n). A comparator generates an interrupt pulse on the occurrence of an equality between the content of the timer and that of the register whereby the sequence of interrupt signals provided by the comparator can control the timing arrangement circuits included in the DTE. The advantage of this embodiment is that the processing means can plan the computing of one digital value within the period of time separated by two successive interrupt signals. This makes the interrupt processing management of the processing means easier.

In a further embodiment of the invention, the DCE includes a DTE receive interface circuit which provides the DTE with a set of N received data bits and with a set of N nominal receive clock pulses at the nominal receive clock rate on the occurrence of one interrupt signal, then stops. Therefore, the processing means which performs a digital processing of the encoded analog signal on the line can directly produce a sequence of digital values controlling the DTE receive interface circuit to provide a receive clock indicating to the DTE when the received data should be sampled in order to determine its true value. An other advantage consists in the fact that a complex baud time/bit time ratio can be provided simply by generating the appropriate sequence of digital value.

In a further embodiment of the invention, the DCE further includes a DTE transmit interface circuit which receives from the DTE a set of N transmit data bits and provides a set of N nominal transmit clock pulses on the occurrence of one interrupt signal (derived from a second sequence of digital values B(n) computed by the processing means). This allows the processing means to easily control the frequency and phase of the transmit clock by means of the generation of the second sequence of digital values. Therefore, by generating a second sequence of digital values being identical to the first sequence A(n), processing means can easily slave the transmit clock to the receive clock when in synchronous mode. On the contrary, processing means can slave the transmit clock on an external clock when in tailing mode by simply adapting the sequence of second digital values B(n).

In a further embodiment of the invention, the DTE receive interface circuit performs the transfer of N received data bits upon occurrence of an interrupt signal of said first sequence of interrupt signal A(n), the transfer occurring at the nominal receiver signal element timing pulse. When the transfer completes, the DTE receive interface circuit continuously maintains the level of voltage corresponding to the Nth bit until the occurrence of the next interrupt signal. Therefore, by programming the next interrupt signal derived from the sequence of digital values A(n), the processing means can control the length of the Nth bit in order to provide a variable STOP bit in asynchronous communication allowing the compensation of the DTE and line data throughput difference.

In a further embodiment of the invention, the DCE includes a D/A converter for performing M signal conversions of PCM digital words into their analog form the nominal transmit clock upon at the occurrence of pulses derived from a third sequence of digital values C(n). Conversely the DCE includes an A/D converter for performing conversions of the analog signal appearing on the line into M digital PCM words at the nominal receive sampling rate upon the occurrence of pulses derived from a fourth sequence of digital values D(n). By controlling the generation of the sequence of digital values C(n) and D(n), the processing means can fully control the frequency and phase of the transmit and receive sampling clocks driving the D/A and A/D converters. By generating a third and a fourth sequence of identical digital values, the A/D and D/A converters are clocked in synchronism as required for digital echo cancellation techniques. Hence, by generating appropriate first, second, third and fourth sequence of digital values, the processing means can provide clock signals slaved to another, or in any phase relationship without the use of complex hardware components.

Other advantages of the invention will appear in the description of a preferred embodiment of the invention.

DESCRIPTION OF THE PREFERRED EMBODIMENTS

Figure 1A:
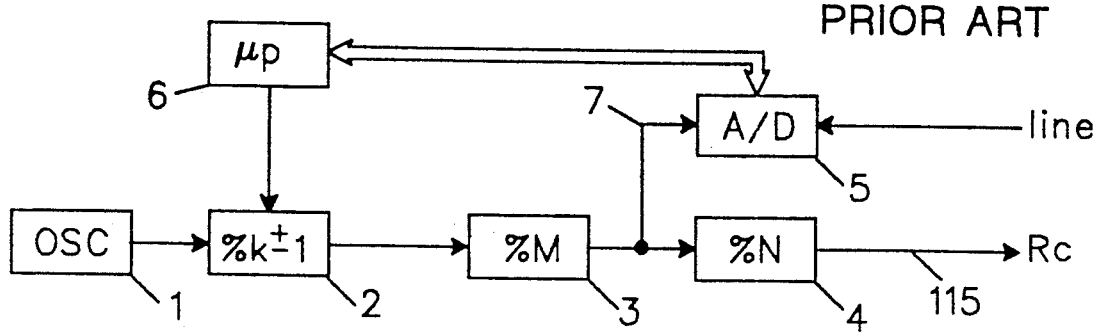
FIGS. 1a, 1b illustrate prior art timing arrangement circuits providing receiver signal element timing and transmitter signal element timing to the DTE.
Figure 1B:
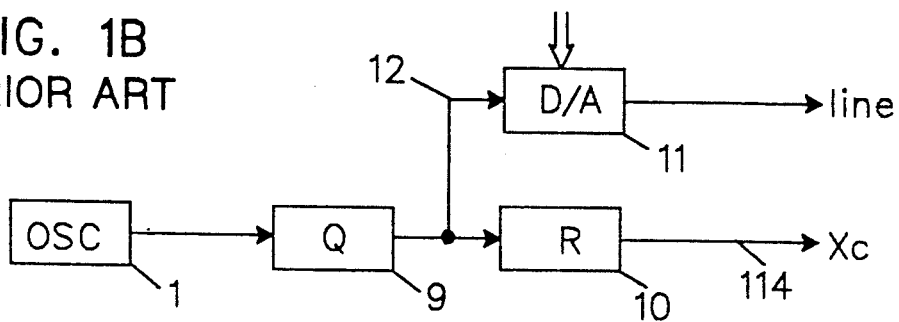
Figure 1C:
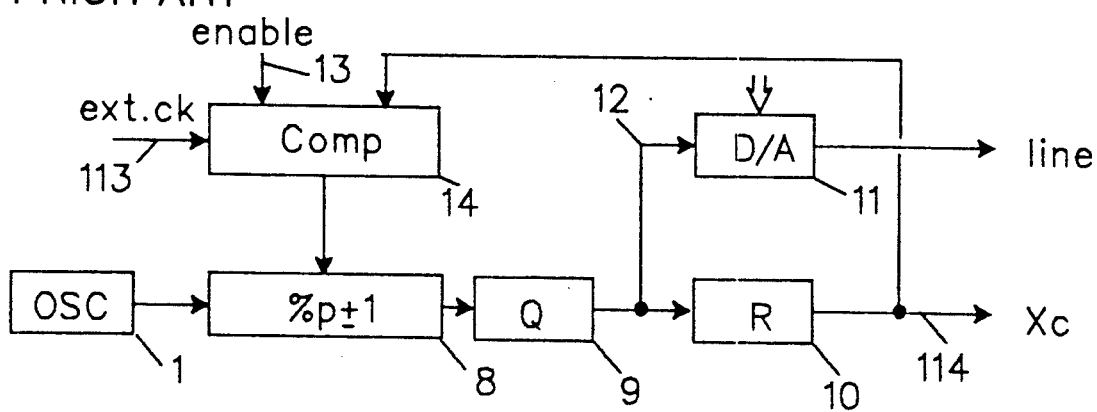
FIG. 1c illustrate prior art timing arrangement circuits providing tailing capabilities.
Figure 2A:
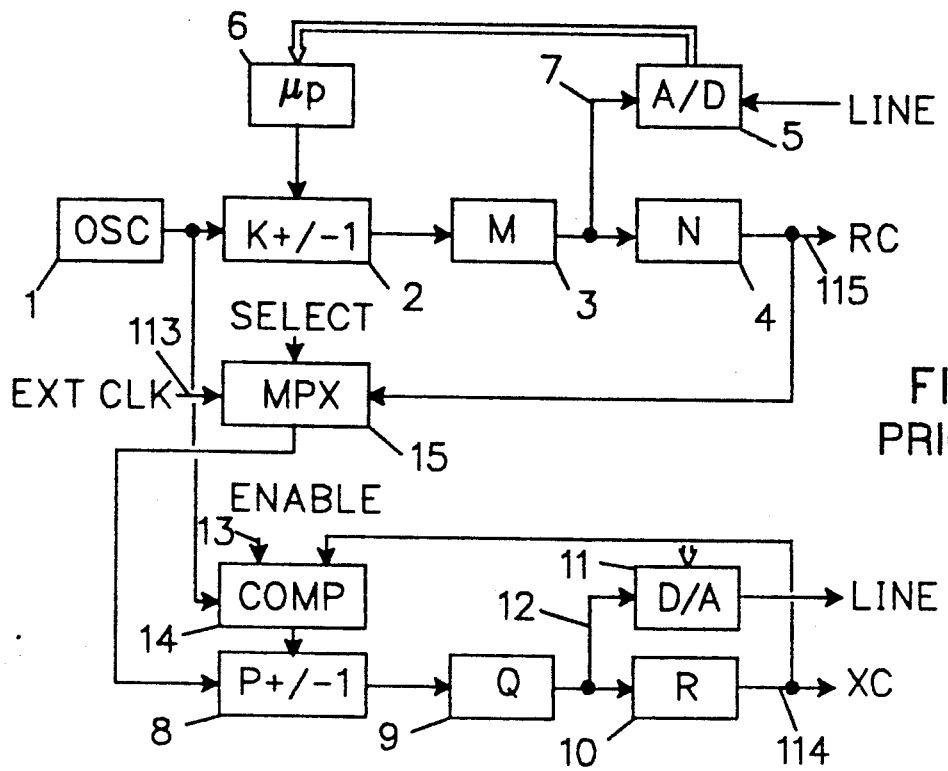
FIG. 2a shows prior art timing arrangement circuits allowing synchronous transmission.
Figure 2B:
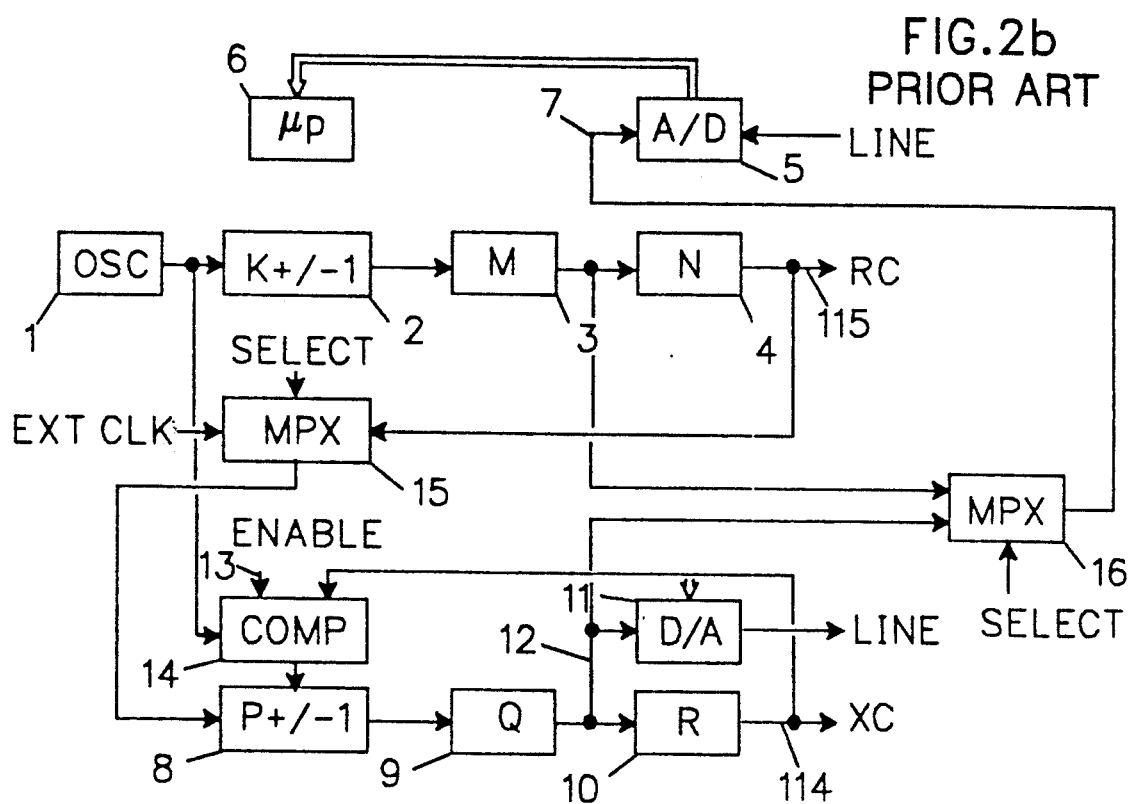
FIG. 2b illustrates prior art timing arrangement circuits involved in full digital echo cancellation techniques.
Figure 3:
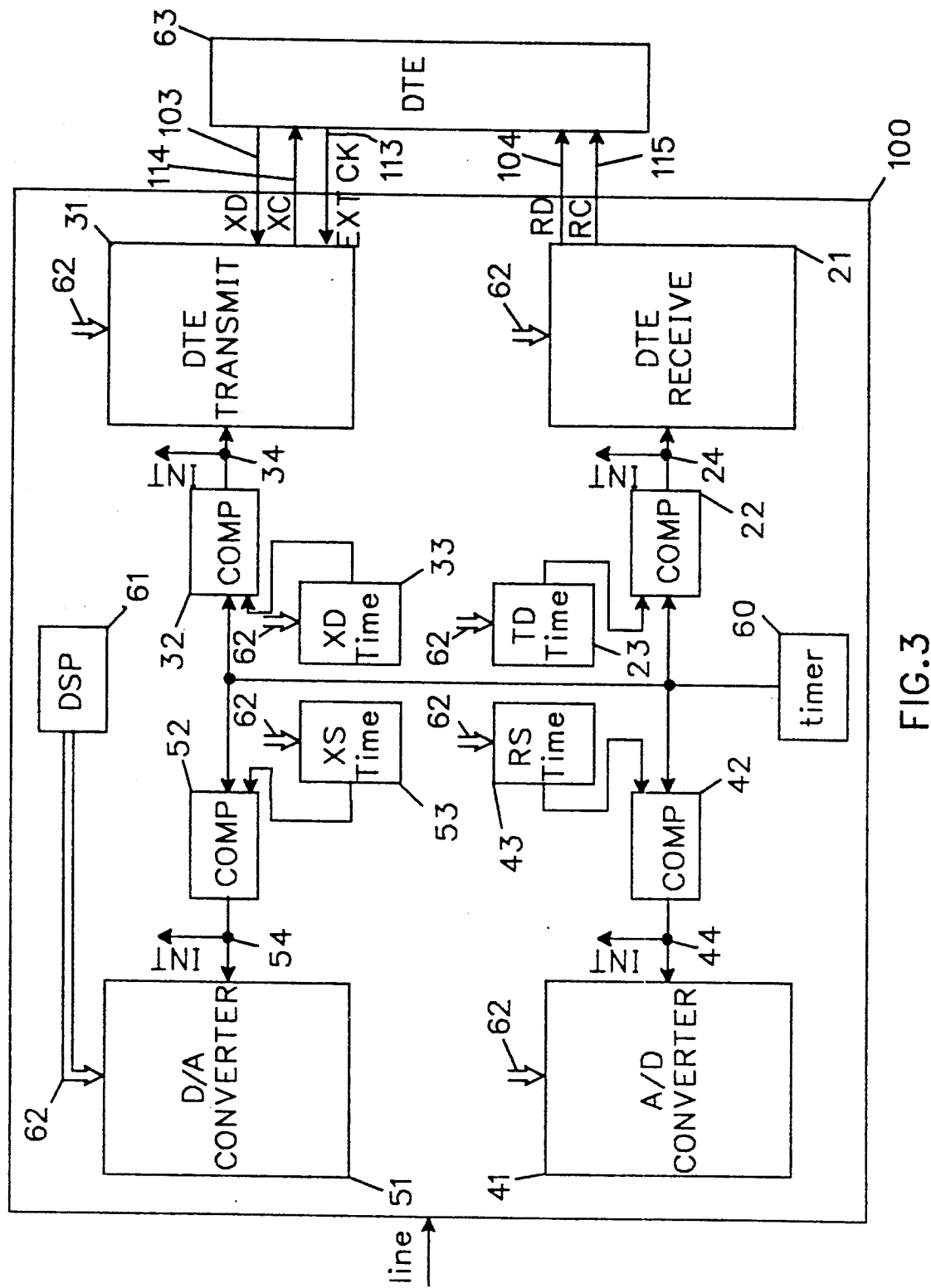
FIG. 3 is a illustrative view of the preferred embodiment of the invention.

FIG. 3 shows DCE equipment 100 according to the present invention. The DCE includes a Digital Signal Processor (DSP) 61 and also hardware basic circuits 21, 31, 41 and 51 which perform functions at the nominal rate upon the occurrence of pulses appearing on control leads. The hardware basic circuits are also connected to the bus 62 of DSP processor 61 and comprises the following elements: a DTE receive interface circuit 21, a DTE transmit interface circuit 31, a A/D converter 41 and a D/A converter 51. The DTE receive interface circuit 21 has the function of transmitting the received data on the CCITT V24 interchange circuit 104 and the receiver signal element timing that is to say the receive clock RC on interchange circuit 115. According to the present invention, DTE receive interface circuit 21 particularly performs an asynchronous transfer of a set of N data bits and generates N nominal receiver signal element timing pulses at the occurrence of a pulse on its control lead 24, then stops. The DTE transmit interface circuit 31 has the function of receiving the data coming from the DTE on interchange circuit 103 according to CCITT V24 Recommendation at the pulse rate of the transmitter signal element timing on interchange circuit 114 provided by the DCE 100. According to the present invention, DTE transmit interface circuit 31 generates N nominal transmitter signal element timing pulses upon the occurrence of a pulse on its control lead 34 in order to receive N data bits on interchange circuit 103. DTE transmit interface circuit 31 also receives the transmitter signal element timing from interchange circuit 113 so that the DCE is able to synchronize to an external clock coming from DTE 63 on interchange circuit 113. A/D converter 41 performs the analog-to-digital conversion of the analog signal received on the telecommunication line. A/D converter 41 performs M sampling operations at the nominal receive sampling clock rate upon the occurrence of a pulse appearing on control lead 44, then stops. In the preferred embodiment of the invention, A/D converter 41 is a sigma-delta coder which converts the analog signal into PCM words at the PCM receive sampling clock pulses, the PCM words being transmitted to DSP processor 61 for further processing. Conversely, D/A converter 51 performs the digital-to-analog conversion of the PCM words coming from the DSP processor 61. D/A converter 51 performs a set of M sampling operations at the nominal transmit sampling clock rate upon the occurrence of a pulse appearing on control lead 24, then stops.

In addition to the above basic circuits 21, 31, 41 and 51, the DCE includes a central timer 60 which is based on a counter which can advantageously be clocked at the DSP processor basic cycle rate. The latter counter is never reset and wraps around to zero when it reaches the value with all bits being equal to one. The size of this counter, being a 16 bit counter in the preferred embodiment of the invention, should be chosen such that the repetition period of that counter is long enough to allow its use as a central timing source.

The DCE according to the present invention further includes at least one register in which the DSP processor can successively store digital values, the latter succession therefore forming a sequence of digital values. In the preferred embodiment of the invention, the DCE includes four registers in which DSP processor may store four sequences of digital values: a first register RDtime 23 associated with DTE receive interface circuit 21, a second register XDtime 33 associated with DTE transmit interface circuit 31, a third register RSTime 43 associated with A/D converter 41, and a fourth register XSTime 53 associated with D/A converter 51. The said registers 23, 33, 43 and 53 are respectively associated with a first comparator 22, a second comparator 32, a third comparator 42 and a fourth comparator 52. The output of these registers are respectively connected to the first input of the corresponding comparator, the second input of which being connected to the timer 60. Each comparator produces a pulse whenever the value of the timer and the value stored in the respective register becomes equal. An equality pulse produced in this manner immediately generates an interrupt signal which is sent to the DSP processor 61. If the interrupt signal is not masked, then the DSP processor 61 accepts it and branches to the corresponding interrupt program entry point. Any write operation to one register resets the interrupt condition. Simultaneously the interrupt signal transmitted to DSP processor 61, the pulse appearing at the output of a determined comparator (resp. comparator 22, 32, 42, 52) causes the associated basic hardware circuit (resp. DTE receive interface circuit 21, DTE transmit interface circuit 31, A/D converter 41, D/A converter 51) to perform its function. Therefore, the DSP processor 61 is able to initiate the function of the corresponding hardware basic circuit and associated timing arrangement circuits. The DSP accomplishes this by means of an appropriate computed sequence of digital values, each of the digital values being successively stored in one determined register, and without strict time relation between the computing process for the sequence of digital values and the occurrence of interrupt signals. The DSP is therefore able to control the timing arrangement circuits from the programmed sequence of digital values.

In a the preferred embodiment of the invention, each of the four hardware basic circuits performs an elementary basic task at its nominal rate then stops, the performance of said elementary task being asynchronously initiated by the interrupt signal appearing at the output of the comparator associated with the determined basic circuit. For instance and as will be described below with more details, when an equality pulse occurs at the output of comparator 24, DTE receive circuit 21 starts to output N data bits on the interchange circuit 104 and generates N receive signal element pulses on interchange circuit 115 at the nominal receive clock rate. When the above basic task completes, for example when the Nth bit has been generated on interchange circuit, 104, the basic circuit waits until a next equality pulse appears at its input control lead. The occurrence of that next pulse will be determined in accordance with the next digital value that DSP processor 61 has computed and stored in the appropriate register (for instance RDtime register 62 in the case of DTE receive interface circuit 21) within the period of time after the occurrence of an interrupt signal. Indeed, one equality pulse appearing at the output of a determined comparator (comparator 22 for instance) is immediately transmitted to DSP processor 61 as an interrupt signal in order to indicate that a next digital value should be computed and stored into the appropriate register (RDtime register 23 for example). The next digital value is required at the latest when the next equality pulse should appear at the output of a determined comparator, after a period of approximately N receive clock pulses, DSP processor 61 has enough time to compute the next digital value and store it into the corresponding register. The work on DSP processor 61 is therefore limited, and the interrupt management processing is made much more easy.

Figure 4:
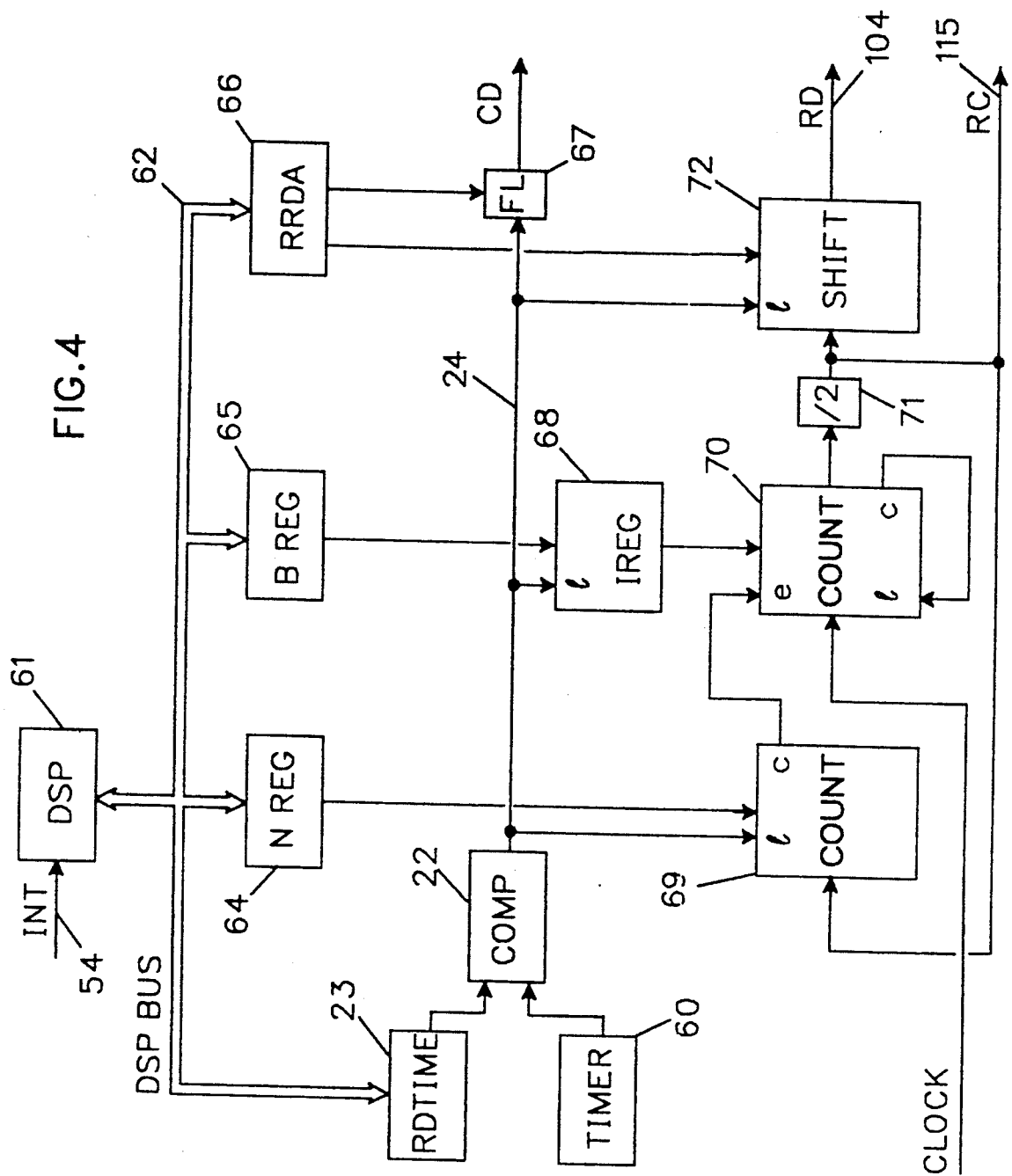
FIG. 4 particularly illustrates the timing arrangement circuits of the DTE receive interface circuit 31 of the DCE according to the invention.

FIG. 4 particularly illustrates the timing arrangement circuit of the DTE receive interface circuit 21 of the DCE according to the preferred embodiment of the invention. DTE receive interface circuit 21 includes a programmable counter 70 which is clocked by a internal clock included into the DCE. That internal clock may advantageously be the same clock which pulses DSP processor 61 and the timer 60. Programmable counter 70 has its CARRY output connected to its LOAD input, so that a CARRY signal will result in the loading of the content of an intermediate register 68 into the programmable counter 70, and an ENABLE input connected to the CARRY output of a second programmable counter 69. Second programmable counter 69 stores the content of N register 64 at the occurrence of a pulse appearing at the output 24 of comparator 22, pulse being transmitted to the LOAD input of counter 69. The output of counter 70 is connected to the input of a divide-by-2 circuit 71, the output of which provides the required receive clock that is to say the receiver signal element timing on interchange circuit 115 according to the CCITT V24 Recommendation. The output of divide-by-2 circuit 71 also clocks the programmable counter 69 and an N-bit-shift register 72, the content of which having been loaded from a RRDA register 66 at the occurrence of the interrupt signal on lead 24 connected to its LOAD input. Registers 64, 65 and 66 are connected to the DSP bus 62 and are respectively loaded with (1) values corresponding to the number of bits N to be transmitted at the nominal rate to the DTE during an elementary task at each occurrence of one interrupt pulse on lead 24, (2) the number of pulses of the internal clock that corresponds to half the bit time and (3) the N bits which will be transmitted at the occurrence of a pulse at the output 24 of comparator 22. In case of a synchronous transmission those bits loaded into RRDA register 66 will generally be data bits that will be transmitted to the DTE. However, for asynchronous transmission according to the CCITT V14 Recommendation, those bits may be either data bits or START and STOP bits. For instance if the RRDA register 66 is a 8-bit-register, the first bit may indicate the START bit of one character while the last bit may correspond to the STOP bit of this character. DCE receive interface circuit 21 therefore generates on interchange circuit 104 a sequence which corresponds to the asynchronous transmission of one character starting with a START bit and ending with a STOP bit. When the DTE receive interface circuit 21 completes its elementary task that is to say has generated the STOP bit on interchange circuit 104, every register and counter remain at their last state and particularly the output of shift register 72 which maintains the value corresponding the STOP bit. That state lasts until a next equality pulse provided by comparator 22 which results in a new operation of the DCE receiver interface circuit 21. The duration of the Nth bit, corresponding to the duration of the STOP bit in the case of an asynchronous communication, is determined by the occurrence of the next equality pulse at a time computed by DSP processor 61. DSP processor 61 can therefore provide, without the use of complex timing arrangement circuits, a STOP bit having a length which is easily controlled in order to compensate for differences between the DTE and the line data throughput. The output of comparator 22 is also used for clocking a latch 67 which is connected to one bit of RRDA register 66 and which therefore provides an output CARRIER DETECT CD signal useful for the DTE equipment.

The timing arrangement circuit of the FIG. 4 works as follows: DSP processor 61 computes and stores a digital value A(n) in RDtime register 23. As soon as the content of timer 60 reaches the value A(n) loaded into RDtime register 23, an equality pulse appears at the output lead 24 of comparator 22 which is passed to DTE receive interface circuit 21. The latter pulse has two effects. Its first effect is to load the contents of register 64, register 65, and register 66 into programmable counter 69, Intermediate register 68 and programmable converter 70, and shift register 72. The loading of programmable converter 70 by pulse on lead 24 through OR circuit 150 is implemented for dynamic speed change (back up speed for instance). The loading of a digital value (which exactly corresponds to the number of bits N which are to be shifted to interchange circuit 104) into programmable counter 69 has the effect of changing the state of its CARRY output and that of the ENABLE input of counter 70, which entails the start of the incrementation or decrementation process of counter 70. Counter 70 is then incremented (in the case of a TTL technology) at the pulse of the internal clock and as soon as its content reaches the value "1111" (in the case of 4 bits counter), its CARRY output switches what enables the loading of the content of intermediary register 68 into programmable counter 70. Since programmable counter 70 has been loaded with a digital value corresponding to the number of clock pulses of the central timing clock forming half the nominal bit time, the CARRY output of counter 70 is activated at a time corresponding to half the nominal bit time. That signal is transmitted to divide-by-2 circuit 71, the output of which generating the receive clock RC which is transmitted to interchange circuit 115 and also to the clock input of programmable counter 69. Therefore, programmable counter 69 allows counter 70 to generate N nominal receive clock pulses until the content of counter 69 reaches its last value. The receive clock pulses appearing at the input of shift register 104 has the effect of generating a set of N read data on interchange circuit 105 at the nominal rate. When both counters 69 and 70 reach their last "1111" value (in the case of 4-bit-counters) the elementary task completes and DTE receive interface circuit 21 waits for the next pulse at the output 24 of comparator 22. Pulse on lead 24 has a second effect of generating an interrupt signal to DSP processor 61 to indicate to the latter that a next digital value A(n+1) must be computed before the instant when the next interrupt signal appearing on lead 24 should occur. DSP processor 61 may or may not again the interrupt request according to its workload. Thus, DSP processor 61 may postpone the interrupt processing within a period of time which is separated by two consecutive interrupt signals. However, the interrupt processing should complete at the latest when the next interrupt pulse on lead 24 should occur. A substantial advantage results from this feature: DSP processor 61 has time enough to plan the processing of the signal interrupt appearing at the output of comparator 22, that is to say the determination of the N following bits which have to be stored into RRDA register 66 and also the calculation of the next digital value A(n+1) and its loading into into RDtime register 23. The efficiency of the DCE is greatly improved. When timer 60 reaches the value A(n+1), which has been stored into RDtime register 23 by processor 62 within the preceding period starting with the occurrence of the preceding interrupt signal on lead 24, a new pulse appears at the output of comparator 22 which starts another function of the DTE receive interface circuit. Thus a new set of N nominal receive clock pulses associated with a new set of N data bits is transmitted to interchange circuit 104. By computing a succession of digital values, which are successively loaded into RDtime register 23, DSP processor 61 can program the successive sequence of interrupt signals at the output of comparator 22 and thus control the frequency and the phase of the receive clocks generated on interchange circuit 115 which are transmitted to the DTE.

Figure 5:
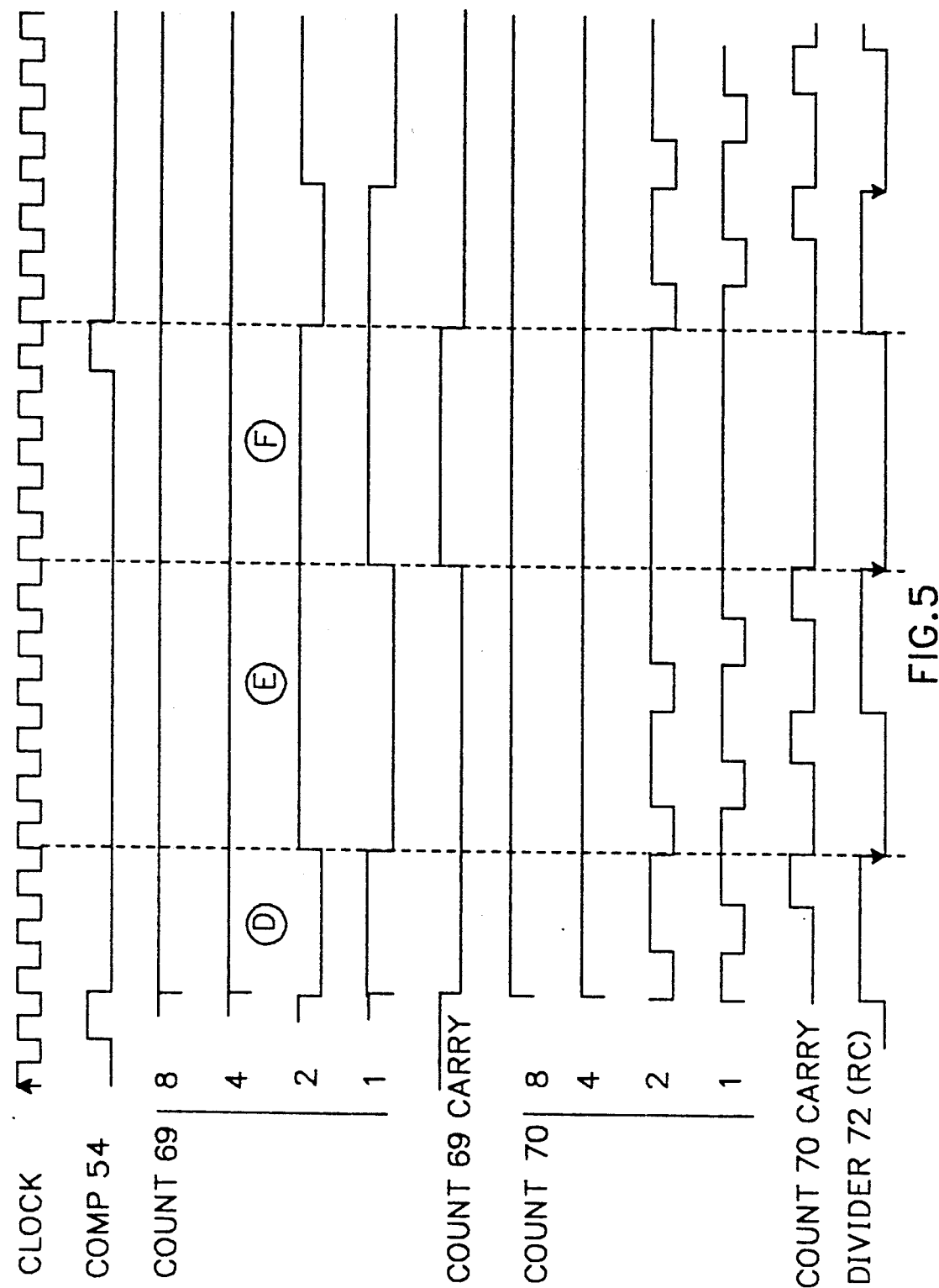
FIG. 5 shows illustrative time diagrams of a example of an embodiment of the invention.

The operating of the timing arrangement circuit of DTE receive interface circuit 21 of FIG. 4 is further illustrated by FIG. 5 which shows illustrative time diagrams for an example of an operation of the invention. In that operation, programmable counters 69 and 70 are 4-bit counters and the clock period has been chosen so that it corresponds to one sixth of a nominal receive clock period for example only. In the real embodiment, programmable counter 70 has more bits to obtain a small jitter on RC. Shift register 72 and RRDA register 66 are two bits registers so that the DTE receive interface circuit 21 generates two data bits at the nominal rate at the occurrence of one interrupt signal pulse appearing at the output of comparator 22. In this example of the invention, the timing arrangement circuit of DTE receive interface circuit 21 is based on a Transistor Transistor Logic (TTL) technology, that is to say that programmable counters 69 and 70 are continuously incremented until they both reach the "1111" value. FIG. 5 respectively illustrates timing diagrams of the internal clock, the voltage on lead 24, the four output leads (resp. Q8, Q4, Q2 and Q1 output) of counter 69, the CARRY output of counter 69, the four output leads (resp. Q8, Q4, Q2 and Q1) of counter 70, the CARRY output of counter 70 and the output of divide-by-2 circuit 72 providing the receive clock. Counter 69 is incremented at the pulse of the receive clock and counter 70 is incremented at the pulse of the internal clock, until the contents of both counters reach the value "1111".This completes the elementary operation task performed by the DTE receive interface circuit 21. Since N equals to two (two bits being shifted by shift register 72 at the occurrence of a pulse appearing on lead 24, and B is equal to 3 (half the bit time corresponds to 3 pulses of the internal clock), DSP processor 61 respectively loads the values '1101' and '1101' ( 'D' in hexadecimal in registers 64 and 65. Therefore, when the content of timer 60 reaches the digital value A(n), which has been computed by DSP 61 within the period of time starting at the preceding interrupt signal on lead 24, an interrupt pulse appears at the output of comparator 24, the falling edge of the interrupt pulse enable the loading of the value '1101' into counter 69, intermediary register 68 and counter 70. Consequently, the CARRY output of counter 69 switches from a high level to a low level what enables the incrementation of register 70 at the pulse rate of the internal clock; that is, the content of programmable counter 70 starts from the value '1101' ('D' in Hexadecimal), then reaches '1110' ('E' in Hexa) at the next clock period, then '1111' ('F' in Hexa). At that instant, the CARRY output of counter 70 switches to a high level thus enabling the loading of the B register, continuously remaining, into intermediary register 68. The falling edge of the CARRY output of counter 70 also enables the switching of divide-by-2 circuit 71 what results in counter 69 being incremented to the next value, that is '1110' ('E' in hexadecimal). At the beginning of the fourth clock pulse, counter 70 performs a new iteration that is the 'D-E-F' incrementation cycle, which provides at the sixth clock pulse, a second pulse at the CARRY output of counter 70. The falling edge of the carry pulse enables the switching of divide-by-2 circuit 71. Therefore, at the end of the third period of the timing clock, that is to say at the end of half a nominal bit pulse since B register equals to 3, counter 70 starts a new incrementation, and every two iterative cycles of counter 70 a falling edge is generated at the output of divide-by-2 circuit 71. The falling edges at the output of divide-by-2 circuit clocks the incrementation process of counter 69. At the second falling edge of the receive clock (that is to say at the 10 th clock pulse), counter 69 reaches the '1111' value ('F' in hexadecimal) what results the CARRY output being set to a high level, and consequently the disabling of programmable counter 70. As a result, from the occurrence of an interrupt signal at the output of comparator 24, divide-by-2 circuit 72 generates two pulses, with each pulse having a length being equal to the nominal receive clock pulse (that is to say 6 internal clock pulses). That generation of two receive clock pulses also enables shift register 72 to transmit to DTE equipment 63 via interchange circuits 104 the two data bits which were loaded into RRDA register 66 by DSP processor 61. At the falling edge of the second receive clock RC pulse, the DTE receive interface circuit stops and remains in this state till the occurrence of the next pulse appearing at the output of comparator 24. Since the DTE receive interface circuit stops at the occurrence of the second falling edge of the receive clock pulse (and more generally at the occurrence of the Nth falling edge of the receive clock pulse), shift register particularly keeps the last value which was loaded from RRDA register and which was shifted to interchange circuit 104. This enables a substantial advantage in view of the CCITT V14 requirements: that is the control of the STOP bit length by DSP processor allowing the compensation of the DTE and line data throughput difference. It should also be noticed that the DTE receive interface circuit 21 and the counters 69 and 70 therein included may be reinitiated from that second falling edge of the receive clock RC (and more generally at the N th falling edge of the receive clock) in accordance with the digital value A(n+1) that is computed by DSP processor 61. It appears that the reinitiation of DTE receiver interface circuit 21 by means of the pulse on lead 24 can occur half a bit time before the time when the rising edge of the next pulse of the nominal receive clock would have occurred, that is to say in our example three clock pulses later than the falling edge of the second receive clock pulse). Naturally, DSP processor 61 may program the reinitiation of the counters 69 and 70 of DTE receive interface circuit 21 exactly when the next pulse of the nominal receive clock RC would have occurred, or later according to the analysis by means of complex and traditional digital processing techniques used to find when the line signal has to be sampled in order to determine its true value. Generally speaking, DSP processor 61 will generate a succession of digital value A(0), A(1), . . . A(n), A(n+1) which will be stored into RDtime register 23, with the value A(n) being computed within the period separated by the two T(n−1) and T(n) interrupt signals on lead 24. The relation between T(n) and T(n+1) is the following:

$$T(n+1) = T(n) + N \times B \pm \epsilon(n)$$

where T(n+1) corresponds to the time of occurrence of the interrupt signal immediately following the nth interrupt signal, T(n) corresponds to the time of occurrence of the nth interrupt signal, B corresponds to the nominal bit time of the received signal, and $\epsilon(n)$ corresponds to the correction factor computed by said processing means from an analysis of the received signal on said telecommunication line.

Upon the occurrence of the interrupt signal T(n) on lead 24, DTE receive interface circuit starts to transfer N bits on interchange circuit 104 and the generation of N Receiver signal elements timing pulses on interchange circuit 115. The DTE receive interface circuit 21 completes that elementary task half a nominal bit time after the transfer of the Nth bit. Within the period (T(n), T(n+1)), DSP processor 61 computes the value of epsilon in accordance with the digital processing techniques of the analog signal received on the telecommunication line. This allows DSP processor to know whether the generated receive clock on lead 115 is in advance or late relative to the right sampling time. The DSP calculates the instant T(n+1) when the next interrupt signal on lead 24 should occur, that is to say the digital value A(n+1) which should be stored into RDtime register 23 before timer 60 reaches the value A(n+1). The latter next digital value A(n+1) will produce an interrupt pulse on lead 24 at the exact time T(n+1). DSP processor 61 also stores a new of set of N data bits which will be transferred at the nominal receive bit time on interchange circuit 104 into RRDA register 66. Generally speaking, those N data bits are determined by traditional digital processing techniques which analyze the PCM coded information provided by D/A converter 51 to DSP processor 61.

It should be noticed that since the times at which equality pulses appear at the output of comparator 22 are computed by the DSP processor 61, the latter processor may compute the appropriate value of $\epsilon$ allowing the lowest level of jitter. Particularly, it could be advantageous to compute large values of $\epsilon$ at the beginning of the transmission when the correct sampling time is not yet established in order to provide a fast synchronization. The synchronization being achieved, lower values of $\epsilon$ can be chosen in order to maintain synchronism which a low level of jitter.

It should also be noticed that the DSP processor 61 may load into the XDtime register 33 successive digital values such as to provide a transmit clock having any desired phase relation with the receive clock.

Moreover, the computation of an appropriate sequence of digital values A(n) corresponding to an appropriate sequence of interrupt signals at the output of comparator 22 associated with appropriate values stored into N register 64 and B register 65 allows the use of arbitrary bit-time/baud-time ratios. For instance, the timing arrangement circuit according to the present invention will allow a complex ratio between modulation baud rate and DTE interface bit speed without additional and costly circuits.

As a result, DSP processor 61 is able to derive from the sequence of digital values A(n) producing a sequence of interrupt signals at the output of a determined comparator a receive clock clearly indicating to the DTE when the data transmitted on interchange circuit 104 should be sampled in order to determine their true value. For multiplexing between multiple DTE parts, it is only necessary to duplicate the DTE receiver interface circuit 21. In this manner, a multiple of interface arrangements can be easily supported under software control.

Figure 6:
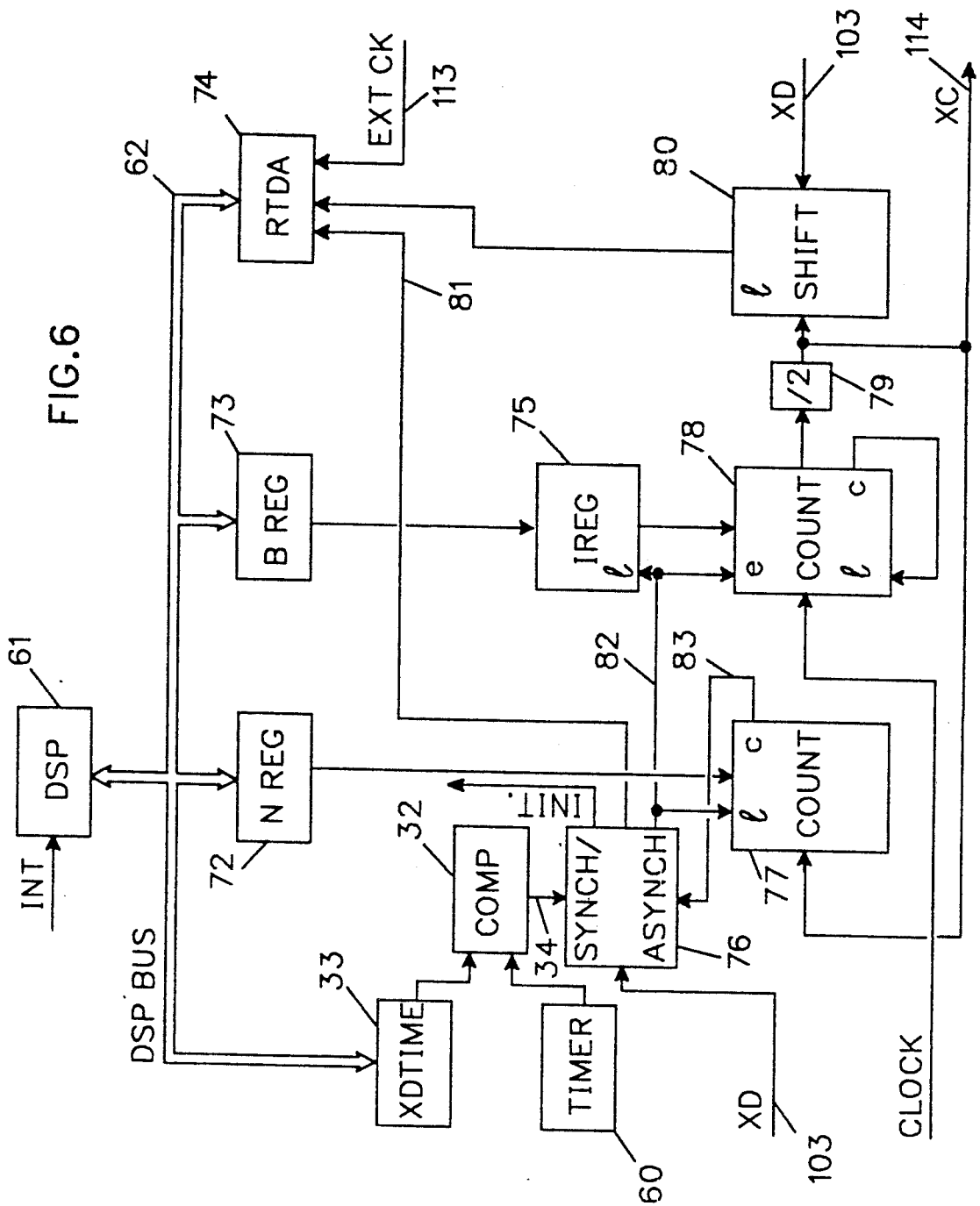
FIG. 6 particularly illustrates the timing arrangement circuit of the DTE transmit interface circuit 31 of the DCE according to the preferred embodiment of the invention.

FIG. 6 particularly illustrates the timing arrangement circuit of the DTE transmit interface circuit 31 of the DCE according to the preferred embodiment of the invention. DTE transmit interface circuit 31 includes a programmable counter 78 which is clocked by the internal clock included into the DCE. Programmable counter 78 has its CARRY output connected to its LOAD input so that a CARRY signal will result in the loading of the content of an intermediate register 75 into the programmable counter 78. Programmable counter 78 has an ENABLE input connected to carry of programmable counter 77. The output lead 82 of the SYNCH/ASYNCH circuit 76 allows the control of DTE transmit interface circuit 31 either by the output of comparator 32 while a synchronous communication, or by the detection of the edge of the start bit transmitted from the DTE on XD lead 103. Lead 82 is respectively connected to the LOAD inputs of counter 77 and intermediate register 75 and of counter 78. SYNCH/ASYNCH circuit receives, in addition to the transmitted data coming from the DTE on lead 103, the CARRY output on a lead 83 of programmable counter 77. The latter programmable counter 77 stores the content of N register 72 at the occurrence a pulse appearing at the output lead 82 of SYNCH/ASYNCH circuit 76 since the pulse is transmitted to the LOAD input of counter 77. The output of counter 78 is connected to a divide-by-2 circuit 79, the output of which provides the required transmit clock, i.e., the transmitter signal element timing on interchange circuit 114 according to the CCITT V24 Recommendations. The output of divide-by-2 circuit 79 also clocks programmable counter 77 and drives the loading of the transmit data coming from the DTE on interchange circuit 103 into N-bit-shift register 80. The content of register 80 is loaded into RTDA register 74 at the occurrence of a pulse appearing on its LOAD input and coming from the output lead 81 of SYNCH/ASYNCH circuit 76. Registers 72, 73 and 74 are connected to the DSP bus 62 and are respectively loaded with (1) values corresponding to the number of bits N to be received at the nominal rate from the DTE, (2) the number of pulses of the internal clock that corresponds to half the bit time and (3) the N bits which will be received at the occurrence of a pulse at the output lead 82 of SYNCH/ASYNCH circuit 76. The timing arrangement circuit of the FIG. 6 works as follows: In a synchronous communication, DSP processor 61 computes and stores a digital value B(n) in XDtime register 33. As soon as the content of timer 60 reaches the value B(n) which is loaded into XDtime register 33, a pulse appears at the output lead 34 of comparator 32 which is passed to DTE transmit interface circuit 31. At the detection of the latter pulse, SYNCH/ASYNCH register generates an interrupt to DSP processor 61 and a pulse to the output leads 82 and 81. SYNCH/ASYNCH circuit 76 thus enables, two main effects: The pulse on lead 82 first enables the loading of the contents of register 72 and register 73 respectively into programmable counter 77 and intermediate register 75 and programmable counter 78 through OR circuit 151. The loading of a digital value (which exactly corresponds to the number of bits N which are to be shifted from interchange circuit 103) into programmable counter 77 has the effect of changing the state of its CARRY output, which change is transmitted to the ENABLE input of counter 78. That results in the start of the incrementation process of the counter 78, which is then incremented at the pulse of the internal clock. As soon as its content reaches the value "1111", its CARRY output switches and enables the reloading of the content of intermediary register 75. Since the latter register has been loaded with a digital value corresponding to the number of clock pulses of the central timing clock forming half the nominal bit time, the CARRY output of counter 78 generates a signal which has half the nominal bit time. That signal is transmitted to divide-by-2 circuit 79, the output of which is the transmit clock XC which is transmitted to interchange circuit 114 and also to the clock input of programmable counter 77. Therefore, programmable counter 77 allows counter 70 to generate N nominal transmit clock pulses until the content of counter 77 reaches the "1111" value. Shift register 80 is loaded with a set of N transmit data coming from interchange circuit 105 at the nominal transmit rate, that is to say when the pulse of the N nominal transmit clock pulse appears at its input. When both counters 77 intermediate register 75 and 78 reaches their last value "1111" (in the case of 4-bit-counters) the process completes and stops until the occurrence of the next pulse at the output 34 of comparator 32. Pulse on lead 34 has a second effect of generating an INT interrupt signal to DSP processor 61 to indicate to the latter that a next digital value will be requested and must be computed before the next interrupt signal appearing on lead 34 should occur. DSP processor 61 may or may not according to its workload accept the interrupt or postpone the processing of the interrupt signal within the period of time separated by two consecutive interrupt signals. When timer 60 reaches the value B(n+1) which has been stored into XDtime register 33 by processor 62 within the preceding period starting with the occurrence of the preceding interrupt signal on lead 34, a new pulse appears at the output of comparator 32 to initiate DTE transmit interface circuit 31 again. Circuit 31 generates a new set of N nominal transmit clock pulses associated with the storage of a new set of N data bits coming from the DTE via interchange circuit 103. Therefore, by computing a succession of digital values B(n) which are successively loaded into XDtime register 23, DSP processor 61 can program the successive sequence of interrupt signals appearing at the output of comparator 32 and thus control the frequency and the phase of the transmit clock generated on interchange circuit 114.

Therefore it appears that in the synchronous communication, the start of an elementary task performed by DTE transmit interface circuit 31, i.e. the receiving of a set of N transmit data bits coming from the DTE at the nominal transmit clock rate, precisely occurs at the instant of the end of the preceding task. The synchronism of the start of a elementary task and the end of the preceding task no longer remain in asynchronous mode. SYNCH/ASYNCH circuit 76 detects the edge of the start bit which is likely to occur on the transmit data circuit 103. At the occurrence of a START bit, SYNCH/ASYNCH generates an output pulse on lead 82, what enables the loading of counters 77 and 78 and therefore the immediate start of the incrementation process of the latter, since the carry output of counter 78 switches off. DTE transmit interface circuit 31 starts the loading of N data bits into shift register 80 at the nominal transmit clock rate, for instance 12 bits in the case when the asynchronous character consists of 12 bits. When the incrementation process of counters 77 and 78 completes, the CARRY output of counter 77 switches ON and at the occurrence of that switching, SYNCH/ASYNCH circuit 76 generates an interrupt signal to DSP processor 61 and a pulse on lead 81 in order to store into RTDA register 74 the character that was just loaded into shift register 80. The interrupt signal transmitted to DSP processor 61 indicates to the latter that asynchronous reception has just been completed.

With respect to the synchronous communication mode again, DSP processor 61 will generate a succession of digital value B(0), B(1), ... B(n), B(n+1) which will be stored into XDtime register 33, with the value B(n) being computed within the period separated by the two T(n+1) and T(n) interrupt signals on lead 34. The relation between T(n) and T(n+1) is the following:

$$T(n+1) = T(n) + N \times B \pm \epsilon(n)$$

where T(n+1) corresponds to the time of occurrence of the interrupt signal immediately following the nth interrupt signal, T(n) corresponds to the time of occurrence of the nth interrupt signal, B corresponds to the nominal bit time of the transmit data, and ε(n) corresponds to the correction factor computed by said processing means from an analysis of the received signal on said telecommunication line in case of synchronous network, or from an analysis of the state of EXRCK 113 in case of external transmit clock.

At the occurrence of the interrupt signal T(n) on lead 34, DTE receive interface circuit operates to load N bits from interchange circuit 103 and to generate N transmitter signal element timing pulses on interchange circuit 114. The DTE transmit interface circuit 31 completes that elementary task half a nominal bit time after the loading of the Nth bit.

Whenever DSP processor 61 decides that the DCE equipment should operate with an internal transmit clock, the latter processor generates a sequence of digital values in which the parameter ε is always equal to zero, i.e., the XDtime register 33 is loaded with sequence of digital values B(n) such that the corresponding interrupt times comply to the following relation.

$$T(n+1) = T(n) + N \times B$$

On the contrary, whenever the DCE should operate in tailing mode, that is to say that internal transmit clock being slaved to the external clock on interchange circuit 113, DSP processor monitors the external clock provided by the DTE and applies to the sequence of B digital values the appropriate correction ε allowing the Transmit clock XC to be slaved to the external clock. In the preferred embodiment of the invention, DSP processor 61 monitors RTDA register 74 in which is stored the instant value of the external clock at the time T(n). A comparison of that value allows DSP processor 61 to determine the appropriate value of ε and to compute a sequence of digital values providing a transmit clock being slaved to the external clock.

Another case is the synchronous mode in which the transmit clock on interchange circuit 114 should be slaved to the receive clock on lead 115. To achieve this goal, DSP processor 61 continuously loads the XDtime register 33 with the sequence of digital values A(n) that has been computed and which is to be loaded into RDtime register 23 also. Therefore, the synchronous mode is simply achieved without requiring the use of complex dividers, multiplexers or switches .... It also appears that the switching of the transmit clock from the internal clock to the receive clock for instance can be provided without involving any glitches since DSP processor 61 can program the next interrupt signal occurring at T(n+1) with (receive clock) or without (internal clock).

Similarly than for the DTE receive interface circuit 21 and DTE transmit interface circuit 31, the D/A converter of the DCE according to the present invention is associated to a XStime register 53 in which the DSP processor can successively store digital values C(n), the latter succession therefore forming a sequence of digital values C(0), C(1), C(2), ... A third comparator 52 is connected to timer 60 and to XStime register and generates an interrupt signal when timer 60 reaches the value stored into XStime register 53. The D/A converter 51 is based on a structure similar to that of the DTE receive interface circuit 21. The occurrence of an interrupt signal on lead 54 also produces two main effects:

A first effect consists in the start of the execution of the elementary task by the D/A converter 51 at the nominal rate, that is to say the performance of M elementary conversions with a transmit sampling clock rate having successive sampling pulses separated by the nominal sampling interval. A second effect consists in the transmission of the interrupt signal to the DSP processor 61 to indicate to the latter that a next digital value C(n+1) is required and must be computed. Generally speaking, processor 61 generates a sequence of digital values C(0), C(1), C(2), ...C(n), C(n+1), with the value C(n+1) being computed within the period separated by the two T(n) and T(n+1) interrupt signals on lead 54. The relation between T(n) and T(n+1) is the following:

$$T(n+1) = T(n) + M \times S \pm \epsilon(n)$$

where T(n+1) corresponds to the time of occurrence of the interrupt signal immediately following the nth interrupt signal, T(n) corresponds to the time of occurrence of the nth interrupt signal, S corresponds to the nominal sampling interval (i.e. a fixed multiple of the internal clock period), and $\epsilon(n)$ corresponds to the correction factor computed DSP processor 61.

A/D converter 41 included into the DCE according to the present invention is associated to a RStime register 43 in which the DSP processor can successively store digital values D(n), the latter succession therefore forming a sequence of digital values D(0), D(1), D(2), ... A fourth comparator 42 is connected to timer 60 and to RStime register and generates an interrupt signal when timer 60 reaches the value stored into RStime register 43. A/D converter 41 is based on the same structure than that of the DTE receive interface circuit 21. The occurrence of an interrupt signal on lead 44 also produces two main effects:

A first effect consists in the start of the execution of the elementary task by the A/D converter 41 at the nominal rate, that is to say the performance of M elementary sampling operations in order to convert the analog signal into digital PCM words, two successive sampling being separated by the nominal sampling interval. A second effect consists in the transmission of the interrupt signal to the DSP processor 61 to indicate the latter that a next digital value DC(n+1) is required and must be computed. Generally speaking, processor 61 generates a sequence of digital values D(0), D(1), D(2), ... D(n), D(n+1), with the value D(n+1) being computed within the period separated by the two T(n) and T(n+1) interrupt signals on lead 44. The relation between T(n) and T(n+1) is the following:

$$T(n+1) = T(n) + M \times S \pm \epsilon(n)$$

where T(n+1) corresponds to the time of occurrence of the interrupt signal immediately following the nth interrupt signal, T(n) corresponds to the time of occurrence of the nth interrupt signal, S corresponds to the nominal sampling interval (i.e. a fixed multiple of the internal clock period), and $\epsilon(n)$ corresponds to the correction factor computed DSP processor 61.

It therefore clearly appears that the receive and transmit sampling clocks can easily be slaved by using the same sequence of digital values C(n) for both controlling the timing arrangements circuits included in the A/D and D/A converters. This will be advantageously used in the case of echo cancellation techniques. It should also be noticed that a given frequency relation between any of the receive clock, the transmit clock, the receive sampling clock, the transmit sampling clock can easily be achieved by means of the timing arrangement circuits of the invention, since processor 61 fully controls the successive digital values of every clock which will be stored in corresponding registers.

At last, it should be noticed that the timing arrangements circuits according to the present invention can be used in other telecommunication equipments, e.g. other types of modems and in DTE equipment.

We claim:

1. A Data Circuit Terminating Equipment (DCE) for allowing connection of a Data Terminal Equipment (DTE) to a telecommunication line, including timing circuits for providing said DTE with the required transmit signal element timing and receive signal element timing at a nominal rate, characterized in that said DCE further includes:

processor means for computing a sequence of digital values A(n) corresponding to required timing instants determined according to the mode of operation of said DCE;

means for deriving from said sequence of digital values A(n) a corresponding sequence of processor interrupt signals T(n) at said required timing instants; and generating means in said timing circuits receiving said interrupt signals T(n) for generating a set of N signal element timing pulses at said nominal rate upon the occurrence of each said interrupt signal T(n), whereby said required signal element timings are provided by said signal element timing pulses generated by said generating means in said timing circuits controlled by said processor means.

2. Data Circuit Terminating Equipment (DCE) according to claim 1 characterized in that said deriving means further includes:

a timer comprising a counter which is continuously clocked by an internal clock, a register for successively storing said sequence of digital values A(n) computed by said processor means, and means for continuously comparing the content of said register with that of said counter and for producing said interrupt signal at the occurrence of an equality.

3. Data Circuit Terminating Equipment (DCE) according to claim 2 characterized in that said generating means comprises:

a Data Terminal Equipment (DTE) receive interface circuit for providing said DTE with a set of N received data bits and with a set of N receive signal element timing pulses at a nominal receive clock rate upon the occurrence of an interrupt signal of a first said sequence of said processor interrupt signals.

4. Data Circuit Terminating Equipment (DCE) according to claim 3 characterized in that said DTE receive interface circuit further includes:

means for transferring N of said received data bits upon occurrence of a processor interrupt signal of said sequence of interrupt signals T(n), said transfer occurring at a nominal receive signal element timing pulse rate, and said means for deriving produces a first sequence of said processor interrupt signal T(n) complying with the following time relation:

$$T(n+1) = T(n) + N \times B \pm \epsilon(n)$$

where T(n+1) corresponds to the time of occurrence of the n+1th said processor interrupt signal, T(n) corresponds to the time of occurrence of the nth said processor interrupt signal, B corresponds to the nominal bit time of the received signal, and $\epsilon(n)$ corresponds to a correction factor computed by said processor means from an analysis of the received signal, whereby said DTE receive interface circuit generates said receive signal element timing pulse precisely indicating to said DTE when the receive signal element has to be sampled in order to determine its true value.

5. Data Circuit Terminating Equipment (DCE) according to claim 4 characterized in that said DTE receive interface circuit further includes:

first means for storing the value B of the number of internal clock pulses corresponding to the nominal receive signal element timing pulse rate, second means for storing the number N of clock pulses to be generated upon the occurrence of one of said sequence of processor interrupt signals T(n), means initiated by the occurrence of one of said sequence of processor interrupt signals for generating a set of N clock pulses at said nominal receive signal element timing pulse rate determined by the content B of said first storing means.

6. Data circuit terminating equipment according to any one of claims 3, 4 or 5 characterized in that said DTE receive interface circuit further includes:

means for transferring N received data bits upon occurrence of a said processor interrupt signal of said first sequence of interrupt signals T(n), said transferring occurring at said nominal receive signal element timing pulse rate and stopping at the Nth data bit, means for retaining the analog voltage level of the Nth said data bit at the completion of said transferring until the next said processor interrupt signal occurs, whereby said processor controls the length of the Nth data bit in order to provide a variable STOP bit in asynchronous communication.

7. Data Circuit Terminating Equipment (DCE) according to claim 6 characterized in that said DCE further includes:

processor means for computing a second sequence of digital values B(n), means (20, 32, 33) for deriving from said second sequence of digital values B(n) a second sequence of said processor interrupt signals, T(n), a DTE transmit interface circuit for receiving from said DTE a set of N transmit data and for providing to said DTE N transmit signal element timing pulses at a nominal transmit clock rate upon the occurrence of a said processor interrupt signal T(n) of said second sequence of interrupt signals, T(n).

8. Data Circuit Terminating Equipment (DCE) according to claim 7 characterized in that said processor means generates said second sequence of digital values B(n) identical to said first sequence of digital values A(n) whereby said DTE receive interface circuit and said DTE transmit interface circuit provide receive and transmit signal element timing pulses, respectively, upon the simultaneous occurrence of said first sequence interrupt signals with said second sequence interrupt signals, said first and second sequence interrupt signals occurring simultaneously because values A(n) are identical to values B(n).

9. Data Circuit Terminating Equipment (DCE) according to claim 7 characterized in that said processor means receives and analyzes an external clock signal and computes a second said sequence of digital values B(n) resulting from said analysis, whereby said transmit signal element timing is slaved to said external clock signal.

10. Data Circuit Terminating Equipment (DCE) according to claim 7 characterized in that said processor means generates said second sequence of digital values B(n) identical to said first sequence of digital values A(n) and switches at a determined instant to a different said second sequence of digital values B'(n) in order to provide a switching of the transmit clock to another clock for allowing test operations.

11. Data circuit terminating equipment according to claim 7 characterized in that said DCE further includes:

processor means for computing a third said sequence of digital values C(n), means for deriving from said third sequence of digital values a third said sequence of processor interrupt signals T(n), a D/A converter for performing M conversions of PCM digital words into their analog form at a nominal rate of said transmit clock upon the occurrence of one said processor interrupt signal T(n) of said third sequence of interrupt signals T(n), whereby said D/A converter performs said D/A conversion at a rate controlled by said third sequence of digital values C(n).

12. Data Circuit Terminating Equipment (DCE) according to claim 11 characterized in that said DCE further includes:

processor means for computing a fourth said sequence of digital values D(n), means for deriving from said fourth sequence of digital values a fourth sequence of said processor interrupt signals, T(n), an A/D converter for performing a set of M conversions of the analog signal appearing on said telecommunication line into M digital PCM words at a nominal receive sampling rate upon the occurrence of one said processor interrupt signal of said fourth sequence of said processor interrupt signals, T(n), whereby said A/D converter performs said A/D conversion at a rate controlled by said fourth sequence of digital values D(n).

13. Data Circuit Terminating Equipment (DCE) according to claim 12 characterized in that said processor means generates said fourth sequence of digital values D(n) identical to said third sequence of digital values C(n), whereby said D/A converter and said A/D converter perform M conversions from digital word to analog signal and from analog signal to digital word, respectively, upon the simultaneous occurrence of third sequence interrupt signals with fourth sequence interrupt signals, said third and fourth sequence interrupt signals occurring at the same time because values C(n) are identical to digital values D(n).

14. A Data Circuit Terminating Equipment (DCE) according to claim 3 characterized in that it further includes:
- processor means for computing a second said sequence of digital values A'(n),
- means for deriving from said second sequence digital values A'(n) a second said sequence of processor interrupt signals T'(n),
- a second DTE interface circuit for providing a second said DTE with a set of N receive data bits and with a set of N receive signal element timing pulses at a nominal receive clock rate upon the occurrence of one said processor interrupt signal T'(n) of said second sequence of processor interrupt signals.

* * * * *